Sept. 27, 1960 W. WRIGLEY ET AL 2,953,926
NAVIGATION SYSTEM
Filed Jan. 18, 1957 6 Sheets-Sheet 1
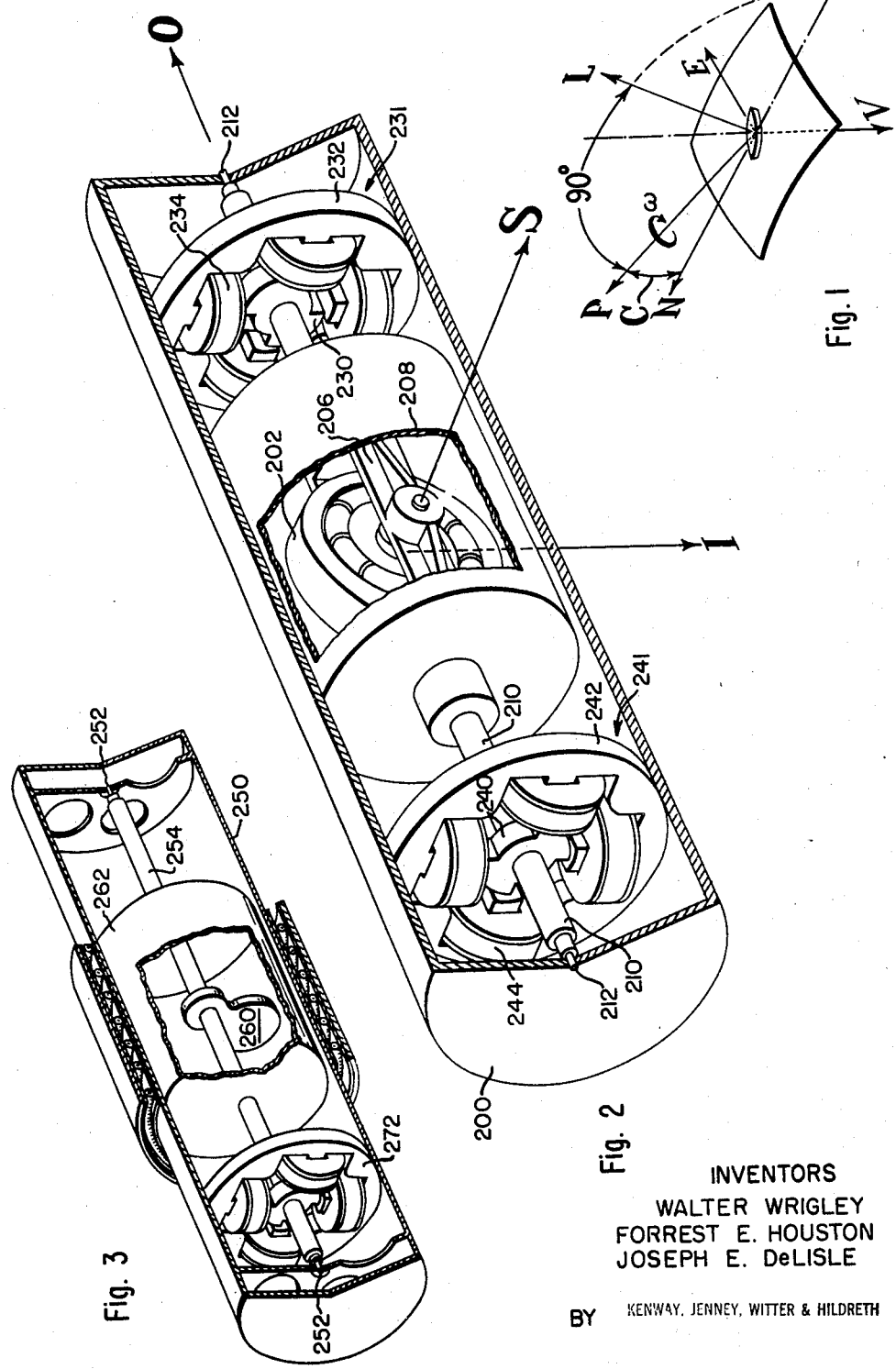
INVENTORS
WALTER WRIGLEY
FORREST E. HOUSTON
JOSEPH E. DeLISLE
BY KENWAY, JENNEY, WITTER & HILDRETH
ATTORNEYS

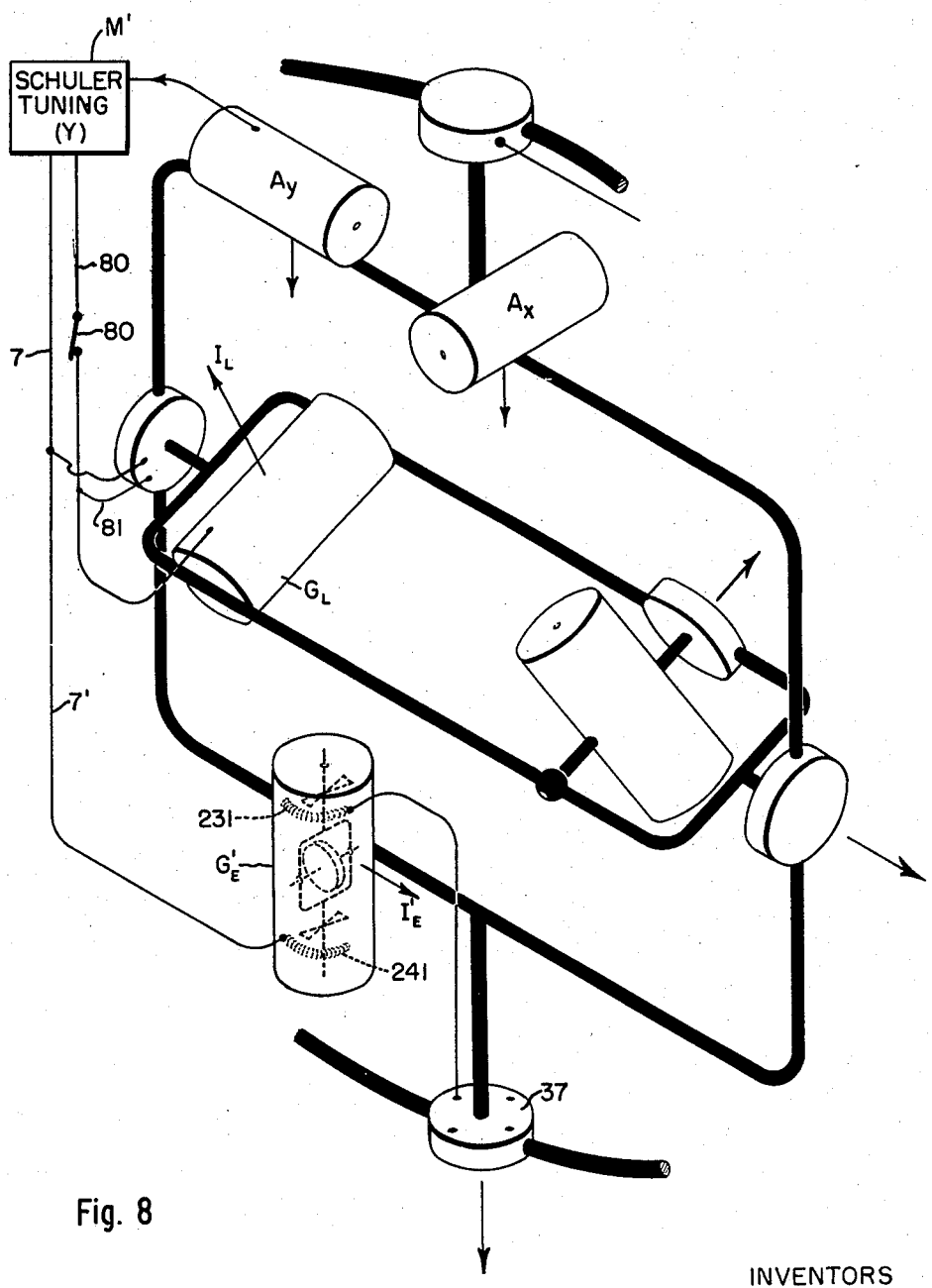

United States Patent Office 2,953,926
Patented Sept. 27, 1960

2,953,926

NAVIGATION SYSTEM

Walter Wrigley, Wollaston, Forrest E. Houston, Westwood, and Joseph E. De Lisle, Arlington, Mass., assignors to Research Corporation, New York, N.Y., a corporation of New York Filed Jan. 18, 1957, Ser. No. 635,043

15 Claims. (Cl. 74—5.37)

The present invention relates to navigational apparatus and more particularly to self-contained apparatus for determining position and azimuth on the earth's surface.

A self-contained apparatus for indicating longitude, latitude and azimuth is described in our copending application Serial No. 414,338, filed March 5, 1954. The apparatus described in that application may be considered to comprise four general elements, namely, (1) gyroscopic means for determining a stable horizontal plane, (2) gyroscopic means for determining an azimuth (e.g. the east direction) on the earth's surface, (3) gyroscopic means sensitive to components of the earth's rotation for determining latitude and (4) gyroscopic means for determining longitude. The apparatus is self-monitoring for latitude and azimuth, in that deviations from true indications result in the operations of drives to restore suitable gimbals to such positions that the gyro outputs are nulled. Since longitude is measured from an arbitrary reference meridian, it is not possible to obtain a self-monitoring indication of longitude, and apparatus in the nature of a memory unit is utilized for the longitude indication.

The principal object of the present invention is to provide improvements in apparatus of the type described in the above-mentioned application, especially in regard to simplified construction, improved stability, and freedom from effects due to accelerations and other disturbing factors.

In the form of the invention specifically shown in the above-mentioned application five gyro units were used, namely, three for stabilization of the horizontal platform and indications of azimuth, one for latitude indication and one for longitude indication. While the use of separate gyros for special functions is conducive to a simplified explanation of the system, it is obviously desirable to reduce as far as possible the number of gyroscopic units that are required. According to the present invention three single-degree-of-freedom gyroscopic units suffice for the entire system. Since three units are theoretically required for reference to axes in three-dimensional space, the present invention provides ultimate simplification so far as the number of units is concerned. The gyros and associated acceleration-detecting units (pendulums) are mounted in three gimbals designated a longitude gimbal, a latitude gimbal and an azimuth gimbal. The azimuth gimbal and two other gimbals (called pitch and roll gimbals) constitute a set of base-motion-isolation gimbals. Certain servo drives primarily actuated by the pendulum gyro outputs are operated to drive the gimbals in a rather complicated fashion as will be hereinafter described in detail in a manner to urge the gyros continuously toward a condition of null output.

The invention also provides for Schuler tuning of the apparatus. As described in the Wrigley & Draper application Serial No. 549,917, filed November 30, 1955, it is desirable to provide Schuler tuning (i.e. an 84-minute period) for the inner gimbals. The principles disclosed in said Wrigley and Draper application are made use of herein.

Other features of construction comprise novel combinations and arrangements of parts hereinafter described and particularly defined in the claims.

In the accompanying drawings, Fig. 1 is a diagram illustrating the relation of the quantities involved in the navigational problem;

Fig. 2 is a broken-away view of the preferred gyro unit;

Fig. 3 is a broken-away view of the preferred form of acceleration detector or pendulum;

Fig. 8 is a diagram similar to Fig. 4 but showing a system with an alternative mounting of the east-seeking gyro.

General

Figure 4:
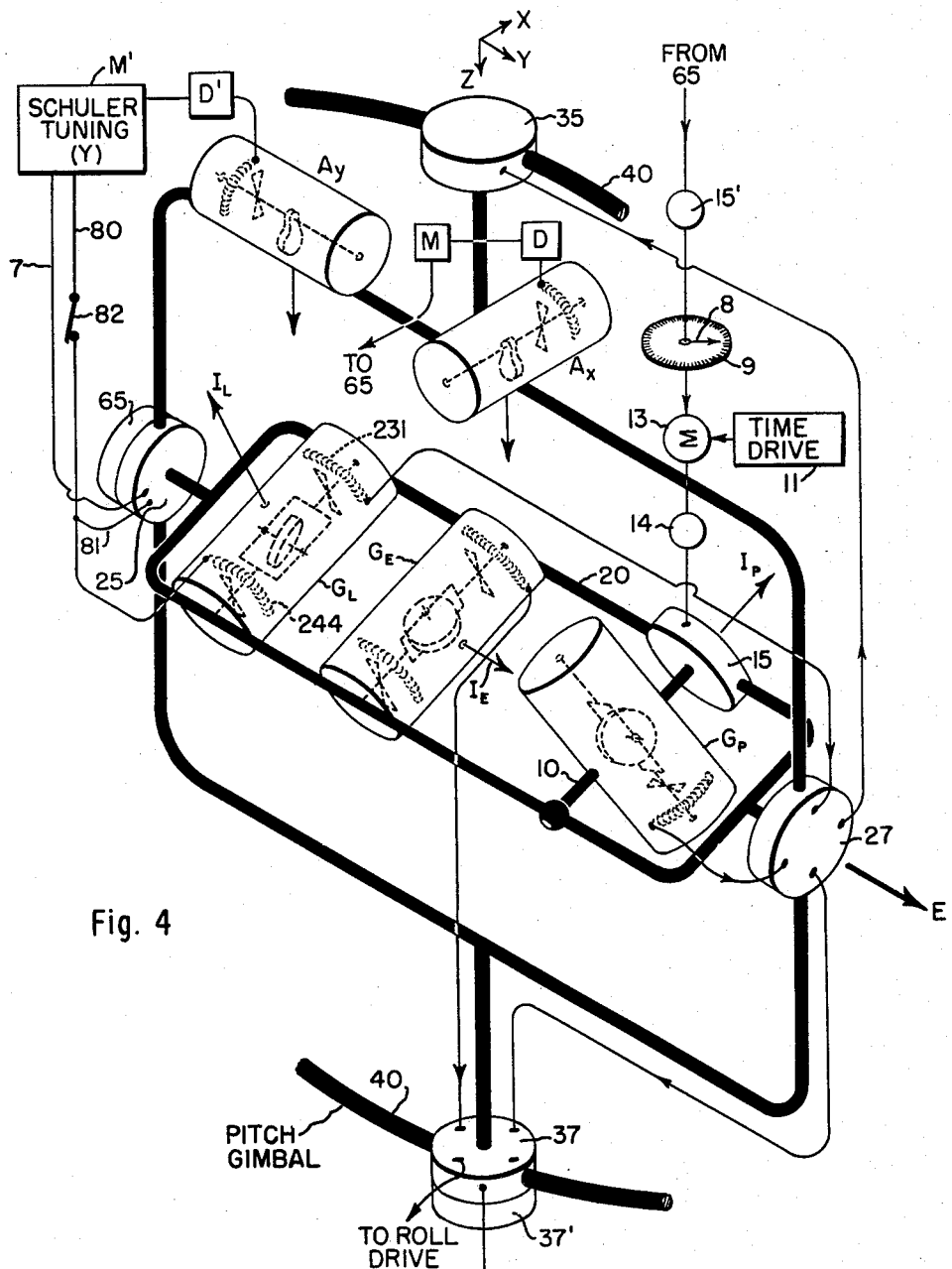
Fig. 4 is a diagram of the inner gimbals and connections of the navigating system of the present invention.

In order to indicate the quantities needed to be known for navigation, Fig. 1 shows a vessel at a point on the earth's surface. N is the north direction, lying in the horizontal plane. E is the east direction, also lying in the horizontal plane. V is the direction of the vertical, that is, the direction a plumb bob would take if hung on a stationary vehicle. P is the direction of the polar axis. P remains fixed in space, regardless of the position of the vehicle on the earth's surface, unlike the other directions shown in Fig. 1. N is the projection of P in the horizontal plane. L is the so-called latitude line. It is a line perpendicular to P and to the east direction at the vessel position. The line L lies in the meridian plane, and its angular displacement from the vertical is the latitude of the vehicle. To navigate, the longitude, latitude, and heading of the vehicle must be known. Longitude is the angle between the meridian plane of the vehicle position and the meridian plane at a reference position. The reference position involves a memory problem, because measurement of longitude involves a comparison with a previously determined physical reference. Latitude, however, can be detected by finding the angle between P or L and N or V. Similarly, the east direction is determined by finding the position of the vector E. According to the present invention the indications of latitude and azimuth are "self-monitoring" in that the apparatus, if at any time subject to a deviation from correct values, will automatically tend toward the correct indications of these quantities.

To find these directions, two types of unit are used: a gyroscope unit and a pendulum unit. The gyroscope is a single-degree-of-freedom integrating gyroscope.

Gyro rotors

The preferred construction of the single-degree-of-freedom integrating gyroscopic unit is described in the patent of Jarosh, Haskell and Dunnell, Patent No. 2,752,791, granted July 3, 1956, and comprises a floating damped gyroscopic unit together with a signal generator and a torque motor on the output axis. The construction will be briefly described herein by reference to Fig. 2 showing a case 200 within which the operating parts are completely enclosed. The gyro rotor 202 is mounted for rotation about its spin axis S in the frame 206 which is attached to the shaft 210 journaled in bearings 212. Also mounted on the shaft 210 is a closed cylindrical casing of chamber 208 having only a small clearance between its outer surface and the inner surface of the case 200. The case is filled with a viscous liquid to float the chamber 208 and also to damp rotations of the chamber 208 with respect to the case.

The shaft 210 carries a signal generator 231 and a torque generator 241. The signal generator has a rotor 230, and a stator 232 which with the stator windings 234, is rigidly attached to the case. The torque generator is likewise shown as a rotor 240 having a stator 242 and stator windings 244. Both units are preferably of the type described in the Mueller U.S. Patent No. 2,488,734, granted November 22, 1949. As described in said patent the signal generator 231 produces an output voltage proportional to the deflection of the shaft 210 from a neutral position. The torque generator produces a torque proportional to the current input to the windings 244, thereby tending to rotate the rotor 240 and shaft 210 with respect to the case 200.

In operation the gyro rotor spins about the spin axis S. The axis of the shaft 210 is the output axis O of the unit. The input axis I is perpendicular to both O and S. Any rotation of the unit about the axis I results in a torque about the axis O which torque is resisted by the damping torque of the viscous fluid in the clearance space between the chamber 208 and the case 200. As a result any deflection about the input axis I will result in a deflection of the shaft 210 within the case 200, and consequently a deflection of the rotor 230 of the signal generator with respect to its stator, thereby producing an electrical output. As described in the Jarosh et al. patent and also in our application Serial No. 414,338 previously referred to, the angular output deflection of the gyro is proportional to the time interval of the angular velocity of rotation of the unit about the input axis, and the unit is therefore properly termed an integrating gyro. The damping also operates to produce integration of any torque applied through the torque motor 241. In other words, the output deflection due to an applied torque is proportional to the time integral of the torque. Hence the total deflection comprises the time integral of the rate of rotation of the unit about the axis I plus the time integral of the torque applied through the torque motor 241.

As described in the Draper et al. patent, No. 2,752,793, granted July 3, 1956, gyro units of this kind are preferably operated in such a manner that the output of the signal generator 231 is fed to a servo drive which operates upon a controlled member (upon which the gyro is mounted) effective to bring the gyro back to such a position that its input axis no longer feels any rotation, and hence the output from the signal generator is nulled. As will be apparent from the later description herein, this general type of system is used, in that gyro outputs are nulled through servo operations on suitable gimbals. The explanation of the operations is, however, rendered somewhat difficult because of the fact that each gyro-servo combination does not comprise a simple self-contained loop, but owing to the relations of the various input axes to earth coordinates, it is necessary to provide resolving procedures; furthermore, the signals from the generators are modified by suitable function networks for the purpose of providing Schuler tuning and introducing correcting and compensating factors as will hereinafter be described. It may be stated in general, however, that the gyro-servo system comprises a velocity drive in that the servo operations are proportional to the gyro deflections and hence at any instant tend to restore the gyros to null positions at rates depending upon the amounts of deviation from null or neutral conditions.

Acceleration-detecting units

The acceleration detecting devices which are used in the present invention are preferably in the form of single-degree-of-freedom damped pendulums of the type particularly described in the Jarosh and Picardi application, Serial No. 222,792, filed April 25, 1951, now Patent No. 2,802,-956, dated August 13, 1957, a brief description of which is given here in connection with Fig. 3. The unit comprises an outer cylindrical case 250 having bearings 252 within which is journaled a longitudinal shaft 254. A pendulous mass 260 is attached to the shaft 254 and is contained in a float chamber 262. The float chamber is attached to the shaft 254 and is mounted to have small clearance with respect to the casing 250. The casing is filled with a viscous liquid which is of a density to float the chamber 262 in the same manner as the float chamber 208 of the gyro unit previously described and to damp rotational deflections of the shaft 154 about its axis. The unit also comprises an electric signal generator 272 identical in structure with the signal generator 231 of the gyro unit shown in Fig. 2. Upon deflection of the pendulous mass 260 from its neutral position with respect to the case 250 an electrical signal is generated which is proportional or substantially proportional to the angular deflection.

Gimbal configurations

The preferred system comprises three of the gyro units of the type shown in Fig. 2 and two of the pendulum units of the type shown in Fig. 3. The units are mounted in five gimbals and the complete gimbal configuration is shown in Fig. 5. However, to simplify the present description we first refer to Fig. 4 in which only the three innermost gimbals are fully shown. These three gimbals are the longitude gimbal 10, the latitude gimbal 20 and the azimuth gimbal 30. The three gyro units are the longitude or polar gyro $G_P$, the east-seeking gyro unit $G_E$ and the latitude gyro unit $G_L$. The two pendulus are the acceleration-detecting units and are designated $A_X$ and $A_Y$.

The longitude gimbal 10 is a shaft on which the gyro unit $G_P$ is mounted, with its input axis $I_P$ normally pointing towards the polar direction. The shaft is rotatable by a servo drive 15, hereinafter called the longitude drive, which, for reasons that will later appear, is preferably a synchro repeater. The longitude gimbal 10 is mounted in the latitude gimbal 20. The two gyro units $G_L$ and $G_E$ are fixed on the gimbal 20. The gimbal 20 is mounted in the azimuth gimbal 30 and is rotatable by a latitude drive servo motor 25 about an axis which is perpendicular to the shaft 10 and hence is normally in the east direction. The azimuth gimbal is normally in a vertical plane and the angle between it and the plane of the gimbal 20 is the indicated co-latitude; this angle "drives" a resolver 27. The azimuth gimbal carries the two pendulum units $A_X$ and $A_Y$ which measure deviations from the vertical about two X and Y axes. The coordinates X, Y and Z are shown with reference to the azimuth gimbal. They represent axes of the gimbal configuration which are to be maintained in correspondence with the directions associated with the navigational problem. Thus, Z is normally to be vertical and Y is normally to be east and X is normally to be north. The Z axis is the axis about which the azimuth gimbal 30 rotates. The azimuth gimbal is supported in the pitch gimbal 40, partially shown in Fig. 4, and later to be described in connection with Fig. 5. The angle between the azimuth gimbal 30 and the pitch gimbal 40 drives an angle resolver 37.

As previously noted, there is a synchro repeater 15 mounted on the shaft 10 to drive the gyro unit $G_P$ about its input axis relative to the latitude gimbal 20, and the latitude gimbal is rotated about the east axis by means of a servo motor or drive unit 25 mounted in the azimuth gimbal 30. The drive for the azimuth gimbal within the pitch gimbal 30 is by means of a servo motor 35, the axis of which is normally vertical.

The pitch gimbal 40 is supported by a roll gimbal 50 and is rotatable about the pitch axis of the vehicle by the servo drive 45. The angle between the pitch gimbal 40 and the roll gimbal 50 is indicated by the angle resolver 47. The roll gimbal 50 is supported by members 60 on a base 3, and is rotatable about the roll axis by a roll drive motor 55.

Considering the gyro-servo loops only, if the base 3 were suddenly rotated, the gyros would produce large, short-period outputs, unlike the small, long-period outputs that result from slight misalignment with the navigational direction. As shown in the block diagram of Fig. 6, these outputs are passed through the various resolvers shown in Figs. 4 and 5 to activate the appropriate servos. The gyro unit $G_P$ detects motion about the axis $I_P$. The gyro unit $G_L$ detects motion about the axis $I_L$. Whenever there is rotation of a gyro about its input axis, there will be a deflection of its output axis relative to its case, and its signal generator will generate a signal. In this description such a signal will be called an output. The outputs of the gyros $G_P$ and $G_L$ are $\epsilon_P$ and $\epsilon_L$, respectively. These two outputs are combined in the latitude resolver 27, which multiplies the two outputs by appropriate trigonometric functions of the angle between the azimuth gimbal 30 and the latitude gimbal 20, as will be well understood by those skilled in the art. Motion about the P and L directions is resolved into motion about the X and Z directions by the resolver 27. One output $\epsilon_Z$ from the latitude resolver 27, representing motion about the Z direction, is applied directly to the azimuth drive 35 to rotate the gimbal in the Z direction until the output is nulled. The other output $\epsilon_X$, representing motion about the axis X is passed to the azimuth resolver 37.

The gyro unit $G_E$ picks up motion about the Y axis and has an output designated $\epsilon_Y$. This output $\epsilon_Y$ and the output $\epsilon_X$ from 27 are fed as inputs to the azimuth resolver 37, and are resolved by trigonometric functions of the angle between the azimuth gimbal 30 and the pitch gimbal 40, into components $\epsilon_{pitch}$ and $\epsilon'_{roll}$. The component $\epsilon_{pitch}$ is applied directly to the pitch drive 45.

The component $\epsilon'$ roll is fed to a pitch resolver 47 which measures the angle between the roll and pitch gimbals, which angle may be taken as the complement of the pitch angle (i.e. between pitch gimbal and base) with sufficient accuracy; the resolver is constructed to multiply $\epsilon'$ roll by the secant of the pitch angle to obtain $\epsilon$ roll which is then applied to the roll drive 55. Although this multiplication is not essential, it is desirable because the mounting of roll gimbal outside the pitch gimbal diminishes the effectiveness of the roll drive by the cosine of the instantaneous pitch angle.

Each pendulum unit has an "output" whenever its pendulum is deflected from its normal or null position in which it hangs free under the influence of gravity alone. Whenever it is deflected to a different position its signal generator 272 generates a signal, which is termed the pendulum output. For the X-pendulum $A_X$ the output is passed through various modifying circuits, to be described in detail later, to a connection 6 leading to the synchro repeater 15 which drives the longitude gimbal 10. For the Y-pendulum $A_Y$ the output is passed through other modifying circuits to a connection 7 leading to the drive 25 on the latitude gimbal 20. It may be noted in general that the signals from the pendulum units are used to drive the inner gimbals, while the signals from the three gyros are used to drive the roll, pitch and azimuth gimbals. So long as the pendulums hang vertically and the gyro input axes are directed along the proper earth coordinate axes there will be no output signals and hence no operation of the drives. However, if one or more units suffers a deflection about its input axis a rather complicated set of actions occurs. For example, an error or deviation of one of the gyros about its input axis results in a gyro output signal, which in turn results in a deflection of the roll, pitch and azimuth gimbals. The deflections of these gimbals cause the pendulums to be moved to positions at which the pendulum units generate signals, and these signals are in turn fed into the inner gimbals of various units in such a manner as to restore the null condition.

One point in respect to the longitude gyro $G_P$ should be mentioned. Although the latitude gyro $G_L$ and the east-seeking gyro $G_E$ sense no components of the earth rotation when their axes are properly aligned, the longitude gyro $G_P$ will sense the earth's rotation W because its input axis $I_P$ lies along the polar direction. If it were uncorrected the gyro $G_P$ would produce a steady output, representing the earth's rate of rotation. To avoid the necessity of correcting for time, a time drive is preferably provided to activate the longitude drive 15 continuously to rotate the gyro $G_P$ at the earth's rate (and in the direction opposite to the earth's rotation) about its input axis. This time drive 11 comprises an accurate clock having a mechanical output in the form of a shaft which rotates once in each sidereal day and which is connected to a differential mixer or adder 13 (to combine with other inputs, as will be later described), and the output from 13 is fed to a synchro transmitter 14 which is electrically connected to the drive 15. The clock may be of any suitable form, preferably utilizing a crystal controlled oscillator. Under system operating conditions, so long as the vessel does not change longitude (the gyro $G_P$ will remain fixed in inertial space, and hence it will appear to rotate within the gimbal 20 at the earth rate).

Connections

The connections between the various units will now be specifically described. Reference to the block diagram, Fig. 6, will be found convenient. In that diagram heavy lines represent supports; thus the pendulums $A_X$ and $A_Y$ are shown as supported on the azimuth gimbal 30, the gyros $G_L$ and $G_E$ on the latitude gimbal 20, and the longitude gyro $G_P$ on the longitude gimbal 10. The light lines show electrical connections and mechanical drive connections. The "inputs" to the pendulums $A_X$ and $A_Y$ are indicated simply as accelerations "$a$," which represent the combined effects of gravity and accelerations of the vehicle. Considering first the pendulum $A_X$, it deflects in response to accelerations and generates an output in its signal generator 272, which output is fed to a signal modification network M. (A demodulator D is provided, since the signal generator is excited with an alternating reference voltage, usually 400 c.p.s., and the signal generator output is therefore a modulated 400-cycle wave; the demodulator converts the signal to a voltage approximately proportional to acceleration, which is fed to the network M.) The network M constitutes one stage of the integration involved in Schuler tuning, as described in the copending application of Wrigley and Draper, Serial No. 549,917, filed November 30, 1955, and as will be more fully described hereinafter. For purposes of the present explanation the block M may be taken as a simple integrator, whereby the output signal is proportional to velocity. Thus, even if the vehicle is traveling at constant velocity, there will be an output from the network M derived from the past acceleration necessary to reach that velocity, even though the pendulum unit $A_X$ is producing no output.

The output from the network M is passed through a resolver 65, which multiplies the output by the secant of latitude. The resolver 65 is on the azimuth gimbal 30 and is driven by the latitude gimbal 20. This multiplication is performed because the component of second derivative of longitude sensed by the pendulum $A_X$ is proportional to the cosine of latitude, and this multiplication at 65 gives a uniform proportionality for all latitudes.

The output from 65, representing earth rate plus rate of change of longitude, drives the motor 15', which as heretofore described, is connected to the mixer 13, in which earth rate is added by the time drive 11. The resultant is fed to the synchro transmitter 14, which operates the synchro repeater 15 through the connection 6 to drive the longitude gimbal 10, in the direction reverse to the earth's rotation.

The gimbal 10 therefore maintains a fixed position in inertial space and turns with respect to the gimbal at the rate of change of the longitude of the vehicle plus earth rate as determined by the integration in the network M. If the integrated signal corresponds exactly with earth rate plus the change of longitude sensed by the gyro $G_P$, no further action takes place. It is not to be expected that the integrated acceleration will maintain sufficient accuracy for a long period, and hence the gyro $G_P$, being responsive to the physical rate of rotation of the vessel about the earth's polar axis, senses the difference and generates an error signal proportional to it, designated in Fig. 6 as $\epsilon_P$. This signal is fed into the latitude resolver 27, and is resolved into a Z-component $\epsilon_Z$ and a horizontal component $\epsilon_X$. The component $\epsilon_Z$ is fed to the azimuth drive 35, and the horizontal component is further resolved into a pitch component $\epsilon_{pitch}$ which is fed to the pitch drive 45, and a roll component $\epsilon'_{roll}$ which is multiplied by the secant of the pitch angle in the resolver 47 on the pitch axis, and the modified signal $\epsilon_{roll}$ is fed to the roll drive 55. These actions turn the three outer gimbals and cause deflections of the pendulums, which in turn generate signals to move the gimbals to such positions that the output of $G_P$ is nulled. In other words, when the longitude gimbal 10 is being rotated at exactly the proper rate to account for earth rate and the vessel's rate of change of longitude, there is no output signal from the gyro unit; under any other condition, a signal is generated which operates on the system to bring the gyro toward the null condition.

In summary, east-west accelerations detected by the pendulum unit $A_X$ are integrated to produce an input corresponding to the east-west velocity of the vessel, and to that input is added another corresponding to the earth's velocity with respect to space. Thus, these inputs, applied to the longitude drive 15, rotate the gimbal 10 at the vessel's rate of travel in space about the polar axis of the earth. The gyro unit $G_P$ senses the physical rate of rotation and monitors the rate derived by the network M.

The pendulum unit $A_Y$ functions with the gyro unit $G_L$ in much the same way to detect the rate of change of latitude. If the azimuth gimbal 30 is properly aligned to the vertical and to east, the pendulum output will be approximately proportional to the north-south accelerations of the vehicle, that is, the second derivative of latitude. The pendulum unit output is integrated once (together with damping) in the Schuler tuning network M', which will be described later. The resulting output is substantially proportional to the north-south velocity of the vessel, that is, the rate of change of latitude. This output is applied through the connection 7 to the latitude drive 25 to rotate the latitude gimbal 20 at the rate of change of latitude so that the position of the latitude gimbal 20 represents latitude. If the gimbal 20 is in the correct position, so that the input axis $I_L$ is perpendicular to the earth's axis, there is no output from the latitude gyro $G_L$, but if the gimbal is not in the correct position for the latitude of the vehicle, the gyro senses a component of earth's rotation and generates a signal $\epsilon_L$, which is resolved in the resolvers 27, 37 and 47 into appropriate components of azimuth, pitch and roll, in a manner similar to the resolution of longitude error. Again the three outer gimbals are rotated in such a manner as to bring about a null condition.

The east gyro unit $G_E$ senses along its input axis $I_E$ a component of earth's rotation if the input axis is not aligned to east. It also senses the physical rate of change of latitude, less the rotation of the latitude gimbal 20. If the gimbal 20 is correctly aligned to east and is rotating at the correct rate of change of latitude, the gyro $G_E$ senses zero rotation and produces zero output; otherwise it generates an error signal $\epsilon_Y$ and applies it through the azimuth resolver 27 to the pitch and roll gimbals to tilt them in a manner similar to the operations previously described until the gyro output is nulled.

Figure 6:
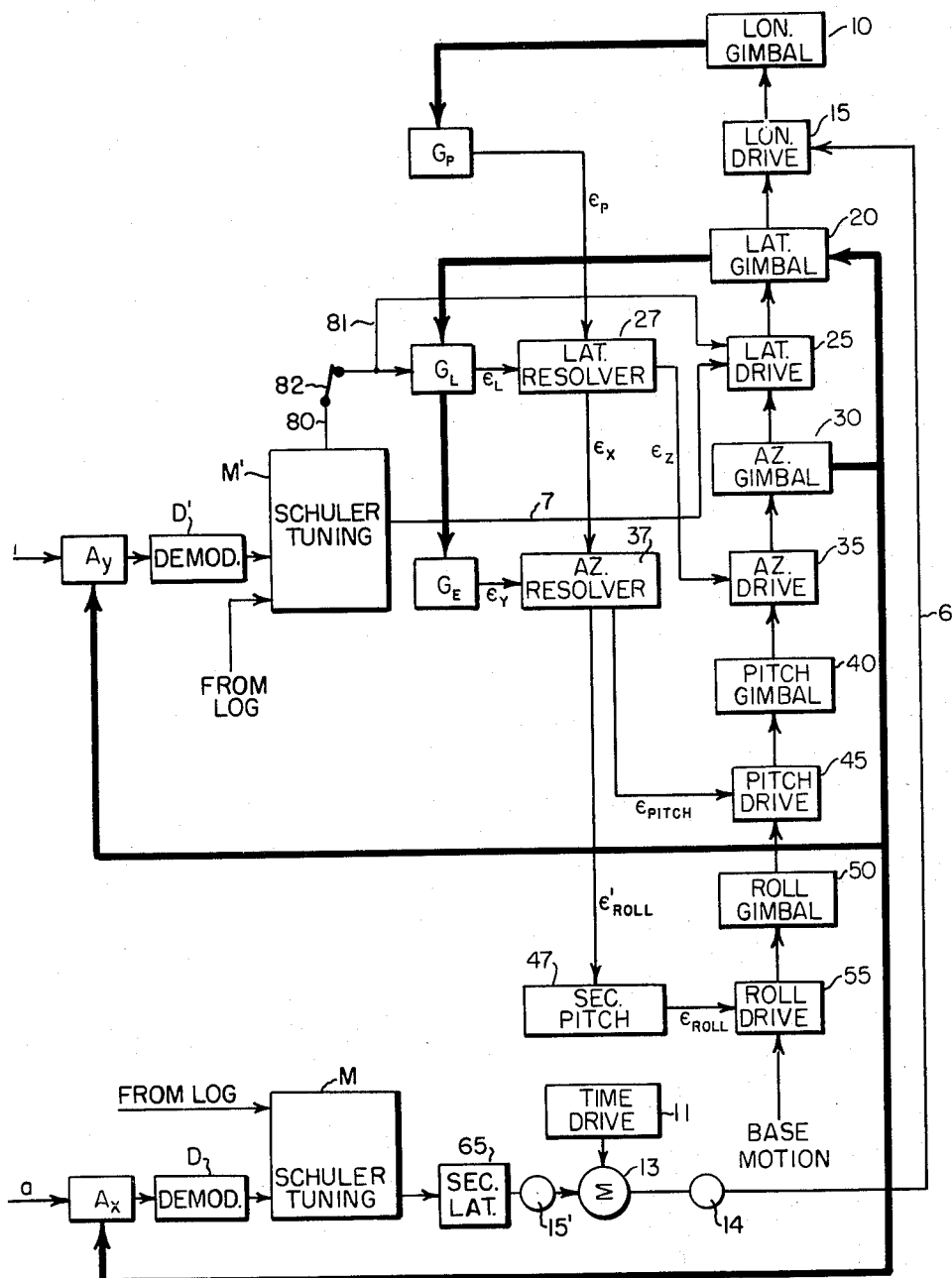
Fig. 6 is a block diagram of the system.

In Fig. 6 are shown connections from the "log" to the Schuler tuning networks M and M'. These are for the purpose of introducing compensation for water speed, as will be described in connection with Schuler tuning networks.

Indications of longitude may be given visually by a hand 8 on the shaft of the motor 15, cooperating with a suitable dial 9. Indications of latitude and azimuth are given directly by the inclination of the latitude gimbal 20 and by the position of the azimuth gimbal 30.

Damping of 24-hour error

The latitude-indicating system has a small oscillatory error with a 24-hour period. This error arises from the fact that the gyro-servo loops tend in themselves to maintain a position of the controlled member in inertial space. The reference to earth-bound coordinates is afforded only by the pendulums. To the extent that the system fails to respond to the pendulum signals, because of lags, non-ideal components, and the like, the indicated polar axis will oscillate about the true axis on the surface of a cone with a 24-hour period, and this will affect the latitude and azimuth indications. The longitude indication is substantially unaffected, since the error produces no appreciable component of motion about the input axis of $G_P$. The total error may amount in amplitude to a few minutes of arc. This is negligible in the azimuth indication, but the latitude error, since it represents an error in position, is preferably damped.

The oscillation may be effectively damped out by applying to the torque generator of the latitude gyro and to the latitude drive 25 a signal which is proportional to $d^2(\text{Lat})/dt^2$, modified by damping. A connection 80 runs from the Schuler tuning network M' to the torque generator of the gyro $G_L$, and a branch 81 runs to the drive 25. The particular arrangement whereby damping is attained will be described later.

Whenever damping is present, a forced error will be introduced under transient conditions, as in executing a sharp turn, for example. It is then desirable to undamp the gyro, and this is readily accomplished by opening a switch 82 during the maneuver.

Summary of operations

Before proceeding to a description of Schuler tuning networks, we shall give a brief summary of the operations of those parts of the system that have been thus far described.

Whenever a gyro produces an output it may represent one of three things. First, it may represent a sudden motion of the base, producing a short-period output from one or more gyros, which output then activates the outer gimbals to null the gyro outputs. This is the process of base-motion isolation, whereby the latitude and longitude gimbals are isolated from motion of the vessel, i.e., roll, pitch and yaw. Second, the gyro output may represent a misalignment of the input axis of the gyro with the navigational direction to which it is supposed to point. Thus, as has been described, if the latitude gyro $G_L$ is not coincident with the direction L the gyro will sense a small component of the earth's rotation, which will cause the servo drives to move the azimuth gimbal 30. Third, a gyro output may represent a torque imposed on the gyro by an output from one of the pendulum units such as the damping signal to the latitude gyro $G_L$ (connection 80). No matter what the gyro output signifies, the servo drives 35, 45 and 55 move the azimuth, pitch and roll gimbals until the gyro output is nulled.

If the vehicle is standing still, but the navigational system is not correctly oriented, the gyros will pick up components of the earth's rotation and activate the servos to move the outer gimbals until the inner gimbals are correctly aligned. Thus, if the azimuth gimbal 30 is turned away from east so that the input axis of the gyro $G_E$ is not correctly oriented, the input axis of the gyro will pick up a component of the earth's rotation proportional (or substantially proportional, for small angles) to the angle of deviation. The gyro will then activate the roll and pitch gimbals, which has the effect of tilting the azimuth gimbal and producing an output from the Y pendulum unit which is sent to $G_L$ and causes the azimuth gimbal to be positioned properly. Small transient errors are also generated in the vertical and latitude but these are damped out simultaneously with registration of the azimuth gimbal. If the latitude gimbal 20 is tilted so that the input axis of the latitude gyro $G_L$ is not aligned to the latitude line L and the input axis of the gyro $G_P$ is not aligned to the polar direction, then gyro $G_L$ picks up a component of the earth's rate proportional to the angle of deviation sensed by the gyro, and the gyro will produce an output. The output from the gyro $G_P$ will energize the outer servo drives to re-align the azimuth member 30, which will in turn cause the pendulum $A_Y$ to produce an output which will cause the latitude drive 25 to align the latitude gimbal 20 correctly. If the azimuth gimbal 30 is not correctly aligned to the vertical, the pendulum units $A_X$ and $A_Y$ produce outputs, tending to erect it properly. The pendulum $A_Y$ will activate the latitude drive 25, causing an output from the gyro $G_L$, which will cause the outer gimbals to re-align the azimuth gimbal 30. Misalignment of the pendulum unit $A_X$ will energize the longitude drive 15, causing an output from the gyro $G_P$ which, in turn, will activate the outer servos to re-align the azimuth gimbal 30.

If the azimuth gimbal 30 is not correctly aligned to the vertical the pendulums in the units $A_X$ and $A_Y$ will hang away from their zero point, producing outputs which when passed through the networks M and M' and the inner gimbal drives 25 and 35 will produce error signals from the gyros $G_E$, $G_L$ and $P_P$ to activate the outer servo drives 45 and 55 to correctly align the azimuth gimbal 30 to the vertical. Such error signals from the pendulum units will be superimposed on their ordinary outputs that indicate vehicle accelerations. When the azimuth gimbal 30 is correctly aligned, the output of the Y pendulum $A_Y$, when integrated, is then simply the rate of change of latitude. Similary, the normal output from the X pendulum $A_X$, when integrated, is the rate of change of longitude.

One important advantage of the invention is that the indication of azimuth is not subject to the "northerly velocity error" which affects all conventional gyrocompasses. This error in the conventional gyrocompass arises from the fact that a component of velocity along a meridian changes the apparent axis of earth's rotation as sensed by the gyrocompass. In the apparatus of the present invention, the error is avoided because the input axis of the azimuth gyro $G_E$ is subjected to a rotation of $d(\text{Lat})/dt$, which exactly cancels the northerly velocity error.

It will be observed that the indications of the system are not dependent on the precision of the resolvers or networks, since the indications are always monitored by the gyroscopes.

*Schuler tuning and waterspeed compensation*

Mention has previously been made of the Schuler tuning characteristics of the system. By Schuler tuning is meant the use of equipment associated with the pendulum to tune the natural period of oscillation of the output to approximately 84 minutes, which is the theoretical period of an earth radius pendulum. Such a pendulum will minimize errors due to accelerations of the vehicle. The subject is treated theoretically in a paper entitled "Schuler Tuning Characteristics in Navigational Instruments" by Walter Wrigley, published in Navigation, col. 2, No. 8, Dec. 1950. It is there shown that a conventional gyropendulum with Schuler tuning is "marginal" (i.e., practically unrealizable), because of the necessity of a very small and precise separation between the pivot and the center of mass.

In the copending application of Wrigley and Draper, Serial No. 549,917, filed November 30, 1955, as a continuation-in-part of an application Serial No. 249,182, filed September 21, 1951, and now abandoned, a so-called modified Schuler-tuned pendulum or accelerometer is described, and this type of Schuler tuning is used in the present invention.

Briefly, the Wrigley and Draper tuning involves an integration of the output of the pendulum, in conjunction with a specified amount of damping. It is shown in the Wrigley and Draper application that Schuler characteristics cannot be obtained with complete freedom of error, but by the use of a specific amount of damping, it is possible to remove the most serious errors, namely, those high-frequency errors which vary with the rate of change of acceleration.

The Schuler tuning networks for the present invention are shown at M and M' respectively for the X and Y coordinates. As heretofore explained in connection with Fig. 3, a deflection of the pendulum 260 from a zero position produces an electrical output from its signal generator 272. Considering the Y coordinate, the electrical output from the acceleration detector $A_Y$ is fed to the amplifier and demodulator D'.

The output from D' is then integrated with damping in the network M'. From this point, the operations will be described, by reference to Fig. 7, in conjunction with the feature of waterspeed compensation.

Figure 7:
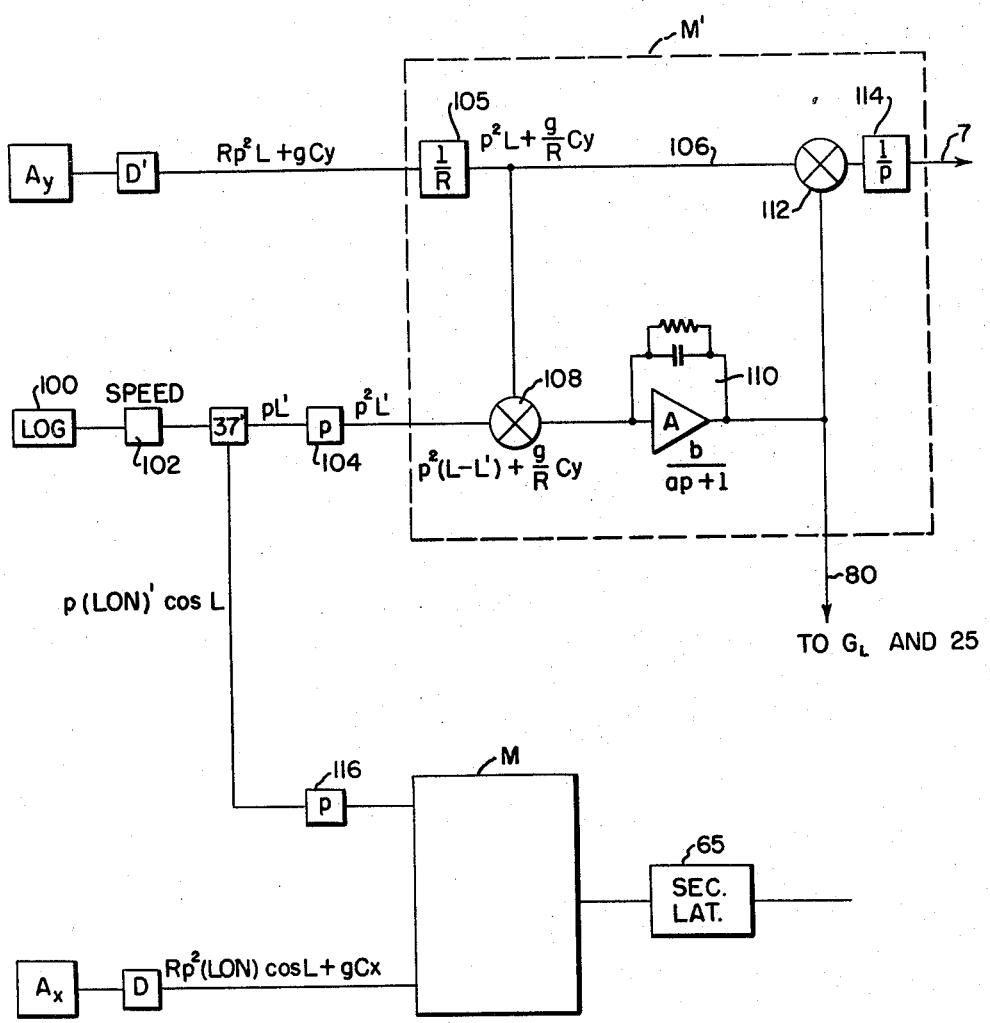
Fig. 7 is a block diagram of a part of the system.

In Fig. 7, the demodulated output of the pendulum $A_Y$ would be ideally $Rp^2L$, where R is the earth's radius and L is the latitude. The operator $p$ is the differential operator and $p^2L$ is therefore the angular acceleration due to the acceleration of the vehicle along a meridian. Multiplication by R gives the linear speed of the vessel. If $Rp^2L$ were divided by R and integrated twice, the result would be simply the total change of latitude, which is what is desired.

However, the pendulum is not an ideal component, and it is subject to errors, because of gyro drift, pendulum uncertainties, and other inaccuracies. Let the instantaneous error angle at the pendulum be $Cy$. Then the pendulum is subjected to a specific force $g \sin Cy$, which for small angles may be taken as $gCy$. This error term is inseparable from the desired term in the absence of information concerning the instantaneous rate of change of latitude of the vehicle. Such information is not available from the gyroscopic equipment, but an approximation is afforded by the waterspeed of the vehicle.

The ordinary pitometer log is indicated at 100. An electrical signal proportional to speed is obtained by a tachometer 102 or similar device. By means of an azimuth resolver 37', the speed is resolved into components $pL'$ and $p(\text{Lon})' \cos L$, where the primes indicate the approximation given by the log. If true ground speed could be measured, it would be at least theoretically possible to obtain latitudinal and longitudinal components of speed with precision, and an exact compensation could be attained.

The latitudinal component of water speed is differentiated in a conventional differentiating network 104 (represented by $p$), whereby the second derivative $p^2L'$ is obtained.

The pendulum output is attenuated by 1/R in a simple network 105, the output of which is then $$p^2L + \frac{g}{R}Cy$$

This output is passed through a direct channel 106, and is later integrated twice, so that the result of the double integration, if no error were present, would be simply the latitude L. Since the quantity R representing the earth's radius has been removed, this would correspond to the integrated output of an earth's radius pendulum, and true Schuler tuning would have been accomplished. However, the error term contributes $gCy/p^2R$ to the integrated output, and if an error $Cy$ originally existed, its effect would manifest itself by an undamped oscillation in the integrated output, with a period of 84 minutes. The purpose of the circuit of Fig. 7 is to damp out the oscillatory error. This is accomplished by passing the output from 105 through a by-pass channel to a mixer 108, where the quantity $p^2L'$ is subtracted, to give $$p^2(L-L') + \frac{g}{R}Cy$$

To the extent that the waterspeed measurement approximates the true speed, the error term $gCy/R$ can be considered to be separated from $p^2L$. The total term $p^2(L-L') + gCy/R$ is then passed through a damping circuit, which is preferably realized by a simple R-C circuit connected between the input and output of a high-gain D.C. amplifier. This circuit has the transfer function $$\frac{b}{ap+1}$$

and represents damping. The output of the by-pass channel is mixed with the direct channel in a mixer 112. The result is that $p^2L$ has been passed through the network without substantial change, while the error represented by $p^2(L-L') + gCy/R$ has been subjected to damping.

In the integrator 114, the acceleration $p^2L$ is integrated to $pL$ (plus the integrated damped error). The integrated output appears as a voltage which is passed through the connection 7 to the drive motor 25 of the latitude gimbal 20. Since the speed of the motor 25 is proportional to voltage, the actual motion of the gimbal represents the integral of the voltage. Hence there is a double integration from $A_Y$ to the gimbal, and the gimbal position therefore indicates latitude.

The realization of the circuits may be in any suitable form, as will be understood by those familiar with network synthesis. For example, the integrator 114 may simply comprise a high-gain amplifier shunted by a large condenser.

The introduction of waterspeed is not essential. If the log connections are omitted, the result will be that the entire term $$p^2L + \frac{g}{R}Cy$$

will be damped in the by-pass channel. As shown in the Wrigley and Draper application, the parameters can be chosen to give a modified Schuler effect, in which there will be an error due to the acceleration, but the error due to rate of change of acceleration will be avoided.

It will be understood that all such errors are transient errors only, and will be ultimately damped out. For example, under the worst condition, a U-turn of the vessel, the maximum error will appear several minutes after the turn is made, but will ultimately be damped out, at a rate determined by the constants $a$ and $b$ of the damping channel. The steady-state indications of position and azimuth are monitored by the gyroscopic units. The advantage of the waterspeed compensation is that it diminishes the magnitude of the transient errors.

The damping for the 24-hour period is preferably taken off the by-pass channel. As shown in Fig. 7, the connection 80 runs from the output of the amplifier 110 to the gyro $G_L$ and the latitude drive 25.

For the X-coordinate, the operations are similar to those described. The longitudinal output of the resolver 37' is differentiated to $p^2(Lon)'\cos L$ at 116 and is introduced into the Schuler tuning and damping network M, substantially identical to M'. The demodulated output from $A_X$ is $Rp^2(Lon)\cos L + gCx$. This is also fed into the network M, the output of which is $p(Lon)\cos L$ plus damped error terms. This output is multiplied by sec L in the resolver 65, the output of which drives the motor 15' to obtain the total change of longitude, which is mixed with earth rate furnished by the time drive 11 to be fed to the longitude gimbal 10.

Alternative constructions

The azimuth gyro may alternatively be mounted on the azimuth gimbal 10, as shown at $G'_E$ in Fig. 8, since its input axis $I'_E$ points east when the inner gimbals are properly oriented. The only circuit change required is that a signal from the Schuler network M' proportional to the rate of change of latitude is fed to the torque generator of $G'_E$. This is accomplished by running a branch connection 7' from the line 7 to the torque generator 241 of the gyro. As previously mentioned, in the form shown in Fig. 4 the input axis of $G_E$ is subjected to a rotation corresponding to $d(\text{Lat})/dt$, and this input cancels out the "northerly velocity error" to which the conventional gyrocompass is subject. In Fig. 8, the northerly error is cancelled by applying to the output axis of the gyro a torque which is of a magnitude proportional to the northerly error. Thus either form of the present invention is free from this error.

Other variations in the components may be made, as will be clear to those skilled in the art. For example, although most of the drive motors and resolvers are shown as being physically mounted at the gimbals, they may be conveniently mounted at a central point, and suitable synchro devices or other data transmitting equipment may be used. This is illustrated in the drawings for the longitude drive, wherein the actual rotation of the gimbal is effected through the synchros 14 and 15, and this same procedure may be used for the other drives and resolvers.

In essence, the apparatus involves two acceleration-detecting units to sense components of acceleration along the normal north and east directions, and three single-degree-of-freedom gyroscopic units to sense rotations about the P, L and E directions shown in Fig. 1. The longitude gyro is continuously subject to the earth's rotation since its axis is normally parallel to the earth's axis. The other gyros sense components of the earth's rotation only when the gimbals are deflected from their true positions. By the connections herein described, the gyro and pendulum outputs are utilized to drive the gimbals in a manner to give continuous indications of position and azimuth, with no information required, other than that afforded by the earth's gravitational field and the earth's rotation.

Conclusion

From the foregoing, it will be seen that we have provided a system for continuously indicating position and azimuth, and that the indications of latitude, vertical and azimuth are self-monitored by reason of information introduced into the system by gravity and the earth's rotation. Although the complete loops have been described, a summary of the monitoring loops will now be given. We refer primarily to the construction of Figs. 4 and 5.

In brief, the signal from the signal generator 231 of the latitude gyro $G_L$ is used to monitor the position of the latitude gimbal $G_L$ about its axis, and the signal from the signal generator of the azimuth gyro is used to monitor the position of the azimuth gimbal 30 about its vertical axis. In each case the signal is generated by sensing a component of the earth's rotation, as described in the Wrigley and Draper applications, Serial Nos. 258,416 and 414,338. However, these gyros also sense other inputs. Thus, if there is motion about a vertical axis the latitude gyro $G_L$ senses a component $$\frac{d(A_z)}{dt}\cos L$$

and whenever the vessel moves with a component along a meridian the azimuth gyro senses $$\frac{dL}{dt} - \frac{d\theta}{dt}$$

where $\theta$ is the angle of inclination of the latitude gimbal relative to the azimuth gimbal. Moreover, the latitude and longitude gyros sense tilts of the azimuth gimbal from a vertical plane, through the pendulum loops heretofore described.

Considering first the azimuth gyro, if the latitude gimbal is correctly positioned, $L=\theta$, and the input to the azimuth gyro simply becomes that due to such component of the earth's rotation as it may pick up by reason of an error in the indication of the east direction. (This also shows that the northerly velocity error is eliminated; in other words, the rotation of the gimbal applies to the azimuth gyro a "signal" which cancels the error due to rate of change of latitude. In the construction of Fig. 8, the error-cancelling signal comes through the connection 7'). As shown in Figs. 5 and 6, the output from the azimuth gyro $G_E$ is ultimately fed to the azimuth drive 35, but in order that information may be fed into the system from the pendulums, such output is channeled through the roll and pitch drives.

Similarly, whenever there is a signal from the latitude gyro $G_L$ it is sent through the azimuth, roll and pitch drives to the latitude gimbal drive 25, by way of the Y-pendulum loop.

The function of the resolvers, as will be clear to those skilled in this art, is to convert from P-L-E to X-Y-Z coordinates that is, polar-latitude-east coordinates to roll-pitch-azimuth coordinates. For example, at the equator, the input axis $I_L$ is normally vertical and senses rotation about the Z-axis only, while at the pole, it would sense rotation about the X-axis only. In intermediates latitudes, the output of $G_L$ (and also the output of the longitude gyro $G_P$) is resolved into a vertical and two horizontal components. The output of the azimuth gyro $G_E$ is resolved into horizontal components only (pitch and roll) because its input axis normally lies in a horizontal plane.

Figure 5:
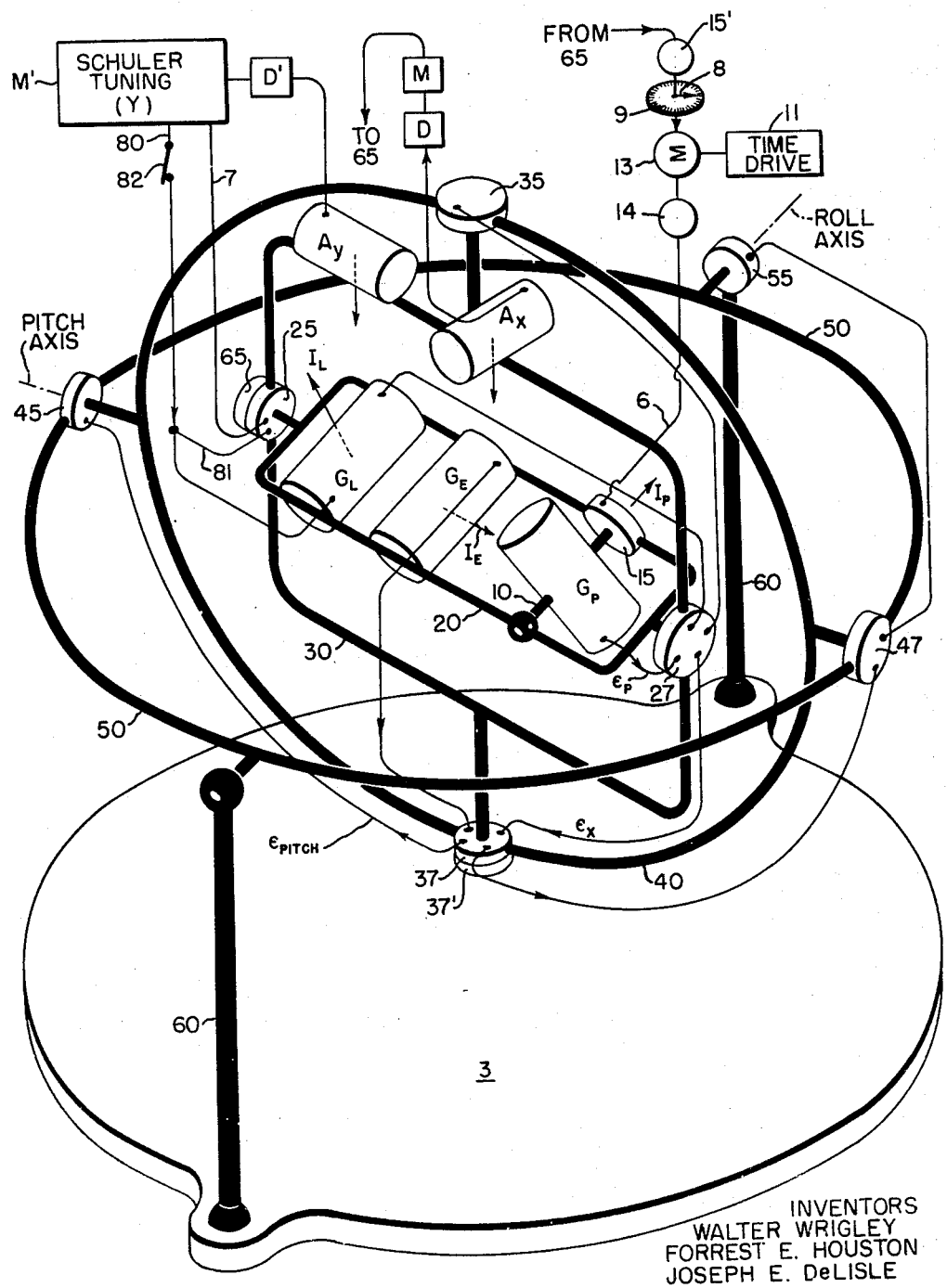
Fig. 5 is a view similar to Fig. 4 but showing the complete system.

If a base were provided which was stabilized to the vertical by means other than the means herein shown, so that the roll and pitch gimbals could be eliminated, the invention would provide a relatively simple form of position and azimuth indicator, particularly in the embodiment shown in Figs. 4 and 5, wherein the azimuth gyro $G_E$ is on the latitude gimbal. In that case, the gyro-servo loop for the latitude gyro would run direct to the latitude gimbal drive 25, as in the Wrigley and Draper application Serial No. 414,338, and the loop for the azimuth gyro would run direct to the azimuth drive as in Serial No. 258,416. Such a system would not require resolvers, and it would have the advantage over the conventional gyro-compass that the northerly velocity error would be eliminated.

Such a system, however, would require additional gyros for base stabilization, and the errors due to gyro drift would therefore be increased. The preferred system, as shown herein, utilizes only three gyros for monitoring position and azimuth indications and also for monitoring the vertical.

Having thus described our invention, we claim:

1. Navigation apparatus comprising three single-degree-of-freedom gyroscopic units, namely, a latitude unit, a longitude unit and an azimuth unit, means for mounting said units with their three inputs mutually perpendicular, base-motion-isolation means, independent drive means for rotating the latitude and azimuth units about axes perpendicular to their respective input axes and for rotating the longitude unit about its input axis, acceleration detecting means to detect components of acceleration about north and east axes, and having signal generator means, connections from the signal generator means to said drive means, said connections including means for double integration, a signal generator for each gyroscopic unit to generate a signal upon a deflection of the unit from a null position, and loop connections from the signal generators of the gyroscopic units to said drives, whereby the drives operate to rotate the gyroscopic units to positions in which their signal generator outputs are nulled.

2. Apparatus according to claim 1 in which the loops including the gyroscopic units have a short period, and the loops including the acceleration-detecting units have a materially longer period.

3. Navigation apparatus comprising an azimuth gimbal and a latitude gimbal rotatable one within the other about a vertical and a horizontal axis respectively, drive means to rotate said gimbals about their respective axes, a single-degree-of-freedom latitude gyroscopic unit mounted on the latitude gimbal with its input axis perpendicular to the axis of the latitude gimbal, a single-degree-of-freedom azimuth gyroscopic unit mounted on one of the gimbals with its input axis parallel to the axis of the latitude gimbal, each gyroscopic unit having a signal generator to generate an electrical signal upon deflection of the gyroscopic unit about its output axis from a null position, a longitude gimbal mounted in the latitude gimbal and rotatable about an axis perpendicular to the axis of the latitude gimbal, a single-degree-of-freedom longitude gyroscopic unit mounted on the longitude gimbal and having an input axis parallel to the longitude gimbal axis, and drive means for the longitude gimbal, whereby the input axes of the latitude, longitude and azimuth units may be oriented respectively perpendicular to the earth's axis, parallel to the earth's axis, and east-west, north and east acceleration-detecting units on the azimuth gimbal, each acceleration-detecting unit having a signal generator, base-motion-isolation means, loop connections including double-integration and damping means from the acceleration-detecting units to the several drives, and additional loop connections between the gyroscopic units to the drives, whereby the gimbals are driven toward positions in which the outputs of the signal generators of the gyroscopes are nulled.

4. Apparatus according to claim 3 in which the loop connections including the gyroscopic units have a short period and the loop connections including the acceleration-detecting units have a materially longer period.

5. Apparatus according to claim 4 in which the outputs of the signal generators of the acceleration-detecting units are connected to rotate said gimbals, and the outputs of the signal generators of the gyroscopic units are connected to operate the base-motion-isolation-means.

6. A combined latitude and azimuth indicator comprising a latitude gimbal and an azimuth gimbal mounted one within the other and having axes of rotation, means for stabilizing the latitude gimbal axis in a horizontal plane and the azimuth gimbal axis to the vertical, a single-degree-of-freedom latitude gyroscopic unit on the latitude gimbal with its input axis perpendicular to the latitude gimbal axis, a single-degree-of-freedom azimuth gyroscopic unit on one of the gimbals with its input axis parallel to the latitude gimbal axis, each gyroscopic unit having a signal generator to generate a signal upon a deflection of the gyroscope from a null position, a drive for each gimbal, connections including the signal generators and the drives to rotate the azimuth and latitude gimbals to positions in which the signal generator outputs are nulled, and means for applying to the azimuth gyro a torque to cancel the azimuth error due to rate of change of latitude.

7. Navigation apparatus comprising an azimuth gimbal and a latitude gimbal rotatable one within the other about a vertical and a horizontal axis respectively, drive means to rotate said gimbals about their respective axes, a single-degree-of-freedom latitude gyroscopic unit mounted on the latitude gimbal with its input axis perpendicular to the axis of the latitude gimbal, a single-degree-of-freedom azimuth gyroscopic unit mounted on one of the gimbals with its input axis parallel to the axis of the latitude gimbal, each gyroscopic unit having a signal generator to generate an electrical signal upon deflection of the gyroscopic unit about its output axis from a null position, a longitude gimbal mounted in the latitude gimbal and rotatable about an axis perpendicular to the axis of the latitude gimbal, a single-degree-of-freedom longitude gyroscopic unit mounted on the longitude gimbal and having an input axis parallel to the longitude gimbal axis, and drive means for the longitude gimbal, whereby the input axes of the latitude, longitude and azimuth units may be oriented respectively perpendicular to the earth's axis, parallel to the earth's axis, and east-west; north and east acceleration-detecting units on the azimuth gimbal, each acceleration-detecting unit having a signal generator, roll and pitch gimbals, drives for the roll and pitch gimbals, loop connections including double-integration and damping means from the acceleration-detecting units to the several drives, and additional loop connections between the gyroscopic units and the drives.

8. The apparatus according to claim 7, in which the loop connections from the acceleration-detecting units run to the drives for latitude and longitude gimbals and the loop connections from the gyroscopic units run to the roll and pitch gimbals.

9. Apparatus according to claim 7 having external means to measure speed over the earth's surface, connections to subtract a quantity dependent on externally measured speed from the outputs of the acceleration-detecting units to obtain a quantity mainly dependent on errors in the acceleration-detecting units, and a damping circuit acting to damp out said error quantity.

10. Navigational apparatus comprising a latitude gimbal, means for mounting the latitude gimbal for rotation about a horizontal east-west axis, a longitude gimbal mounted in the latitude gimbal and rotatable about an axis perpendicular to the axis of the latitude gimbal, an azimuth gimbal in which the latitude gimbal is mounted, means for mounting the azimuth gimbal for rotation about a vertical axis, three single-degree-of-freedom gyroscopes, including a longitude gyroscope mounted on the longitude gimbal with its input axis along the gimbal axis and a latitude gyroscope with its input axis perpendicular to the axes of the longitude and latitude gimbals, an azimuth gyroscope mounted on one of azimuth and latitude gimbals and having its input axis along the axis of the latitude gimbal, signal generators for the several gyroscopes, servo drive means for rotating the latitude and azimuth gimbals to null the signals of the latitude and azimuth gyroscopes, and servo drive means for rotating the longitude gimbal to maintain the longitude gyroscope fixed in inertial space.

11. Navigational apparatus according to claim 10 including acceleration-detecting means to detect accelerations about axes in the horizontal plane, signal generators for said acceleration-detecting means, and connections from the signal generators of the acceleration-detecting means to said drives, the connections forming loops including means for double integration and damping, whereby the period of said loops is materially longer than the period of the servo drives.

12. Navigational apparatus according to claim 1 in which the latitude gyroscope is provided with torquing means for applying a torque about its output axis, and means for energizing the torquing means by a signal originating in the accelerating detecting means.

13. Navigational apparatus according to claim 7 in which the latitude gyroscope is provided with torquing means for applying a torque about its output axis, and means for energizing the torquing means by a signal originating in an accelerating detecting unit.

14. Navigational apparatus according to claim 11 in which the latitude gyroscope is provided with torquing means for applying a torque about its output axis, and means for energizing the torquing means by a signal originating in the accelerating detecting means.

15. Apparatus according to claim 1 having external means to measure speed over the earth's surface, connections to subtract a quantity dependent on externally measured speed from the outputs of the acceleration-detecting means to obtain a quantity mainly dependent on errors in the acceleration-detecting means, and a damping circuit acting to damp out said error quantity.

References Cited in the file of this patent

UNITED STATES PATENTS

| | | |
|---|---|---|
| 1,253,666 | Carrie | Jan. 15, 1918 |
| 2,046,890 | Young | July 7, 1936 |
| 2,414,291 | Evans | Jan. 14, 1947 |
| 2,762,123 | Schultz | Sept. 11, 1956 |
| 2,835,131 | Vacquier et al. | May 20, 1958 |